United States Patent

Arnett

[11] Patent Number: 6,074,256

[45] Date of Patent: Jun. 13, 2000

[54] HIGH PERFORMANCE ELECTRICAL CONNECTOR ASSEMBLY

[75] Inventor: Jaime Ray Arnett, Fishers, Ind.

[73] Assignee: Lucent Technologies Inc., Murray Hill, N.J.

[21] Appl. No.: 09/292,229

[22] Filed: Apr. 15, 1999

[51] Int. Cl.[7] .................................................. H01R 24/00
[52] U.S. Cl. ........................ 439/676; 439/188; 439/955; 200/51.06
[58] Field of Search ..................................... 439/676, 188, 439/955; 200/51.03, 51.05, 51.06, 51.09

[56] References Cited

U.S. PATENT DOCUMENTS

| | | | |
|---|---|---|---|
| 4,261,633 | 4/1981 | Abernethy . | |
| 4,699,443 | 10/1987 | Groodrich et al. | 439/188 |
| 5,041,018 | 8/1991 | Arnett | 439/536 |
| 5,096,439 | 3/1992 | Arnett | 439/536 |
| 5,096,442 | 3/1992 | Arnett | 439/676 |
| 5,186,647 | 2/1993 | Denkmann | 439/395 |
| 5,302,140 | 4/1994 | Arnett | 439/557 |
| 5,346,405 | 9/1994 | Mosser, III et al. | 439/188 |
| 5,647,767 | 7/1997 | Scheer et al. | 439/620 |
| 5,867,576 | 2/1999 | Norden | 439/188 |

*Primary Examiner*—Lincoln Donovan
*Assistant Examiner*—Hae Moon Hyeon

[57] ABSTRACT

A selectable compatibility electrical connector assembly for use in a high performance connection has a plug and a jack, which mate together in the high performance mode, but each of which has contained therein a printed wiring board having circuitry thereon that converts either the plug or the jack to a low performance connector component when used with a low performance mating component. Both the plug and the jack have actuator members which respond to the mating of a low performance component to introduce the printed wiring board or other source of capacitance into the circuit.

6 Claims, 6 Drawing Sheets

TABLE 10 - 9

UTP CONNECTING HARDWARE NEXT LOSS

| FREQUENCY (MHZ) | CATEGORY 3 (DB) | CATEGORY 4 (DB) | CATEGORY 5 (DB) |
| --- | --- | --- | --- |
| 1.0 | 58 | 65 | 65 |
| 4.0 | 46 | 58 | 65 |
| 8.0 | 40 | 52 | 62 |
| 10.0 | 38 | 50 | 60 |
| 16.0 | 34 | 46 | 56 |
| 20.0 | -- | 44 | 54 |
| 25.0 | -- | -- | 52 |
| 31.25 | -- | -- | 50 |
| 62.5 | -- | -- | 44 |
| 100.0 | -- | -- | 40 |

*FIG. 3*

HIGH PERFORMANCE ELECTRICAL CONNECTOR ASSEMBLY

RELATED APPLICATIONS

This application is related to, and deals with subject matter similar to that of U.S. patent applications Ser. Nos. 09/236,754; 09/236,755; and 09/236,757, of Jaime R. Arnett, filed Jan. 25, 1999, the disclosures of which are incorporated by reference herein.

FIELD OF THE INVENTION

The present invention relates generally to electrical connectors and, more particularly, to a modular connector of the type used in telecommunications equipment.

BACKGROUND OF THE INVENTION

Telecommunication equipment has benefited from the design of electrical plugs and jacks that provide easy connect/disconnect capability between electrical circuits within the telecommunications equipment and, for example, local network wiring. Such plugs and jacks are particularly popular in association with telephone sets, where they were first used, and, more recently, in association with a large variety of peripheral equipment that is connected to telephone lines. The modular plugs and jacks in use today have been standardized, insofar as their performance specifications are concerned and also insofar as certain critical dimensions and structural features are concerned. The use of these devices has become so widespread that new houses and other buildings are prewired with jacks located throughout the various rooms as well as other strategic locations, to accommodate the communication equipment. Where large numbers of such connections are needed, it is typical practice to route the wires to a central location, such as a communication closet where, typically, the jacks are mounted on patch panels. Such an arrangement is shown, for example, in U.S. Pat. No. 5,096,439 of J. R. Arnett. In most installations, it is desirable that the jack be compact, and there have been numerous jacks designed to achieve this goal. In U.S. Pat. No. 5,096,442 of J. R. Arnett there is shown one such compact jack and plug arrangement. The compact electrical connector shown in that patent includes a metallic lead frame mounted to a spring block. The lead frames comprise a number of flat elongated conductors, each terminating in a spring contact at one end and an insulation displacement connector at the other end. The insulation displacement connectors are folded around opposite side walls of the spring block and achieve compactness, and the spring contacts are folded around the front surface of the spring block for insertion into a jack frame. The front surface of the spring block includes a tongue-like projection which fits into one end of the jack frame and interlocks therewith. With the ever increasing numbers of peripheral equipment, and with concomitant increases in operating frequencies, such as required in digital data transmission, connector assemblies such as shown in the aforementioned Arnett '442 patent, while enjoying a large amount of commercial success, do not function well in the higher frequency ranges. The use of such plugs and jacks is impaired by crosstalk within the components, especially in the plug, and as frequencies increase, so does the effect of crosstalk. Numerous arrangements have been proposed for reducing the effects of crosstalk overall by connectors having a minimum of crosstalk, or by connectors which add compensating crosstalk to the overall circuit, such as adding capacitance to the jack to nullify or compensate for the crosstalk in the plug. In U. S. Pat. No. 5,186,647 of W. J. Denkmann et al., there is shown an electrical connector for conducting high frequency signals in which the input and output terminals are interconnected by a pair of metallic lead frames mounted on a dielectric spring block. The lead frames, which are substantially identical to each other each comprises several flat elongated conductors, terminating in spring contacts at one end and insulation displacement connectors at the other end. The conductors are generally parallel and close to each other, but three conductors of one frame are arranged to overlap three conductors of the other frame in a crossover region. As a result, the crosstalk between the several conductors is reduced, due to the reversal in polarities caused by the crossovers.

Nevertheless, for a wide range of applications, an electrical connector having even less crosstalk would be desirable. In particular, the rate of data flow, which is continually being increased in the art today, causes the wiring parts to become, in effect, antennae which both broadcast and receive electromagnetic radiation, thereby, in effect, coupling different pairs of wires together, (crosstalk), thereby degrading the signal-to-noise ratio, and producing an increased error rate. Connectors which, in effect, nullify or at least reduce overall crosstalk, and yet which are usable over wide frequency ranges, are desiderata to which the present invention is addressed. In order for wide frequency usage to be possible, it is desirable that at least some of the components of the connector be compatible with components of connectors in both the low and the high performance categories.

The aforementioned related applications of Jaime R. Arnett, the present inventor, the disclosures of which are incorporated herein by reference, deal with selectable compatibility connectors, plugs, and jacks wherein a connector assembly of a plug and a jack, which are designed to operate together as a high performance connector, but which automatically introduce capacitance into the connection circuit when used as a component or components of a low performance connector to alter the crosstalk performance and transmission loss characteristic thereof. The terms "high" and "low" are terms of art and relate to several connector parameters, chief among which is crosstalk, as will be discussed more fully hereinafter. It is desirable, for optimum performance, that the plug and the jack operate together in the desired frequency range. Thus a low performance jack should operate with a low performance plug, and a high performance jack should operate with a high performance plug.

In greater detail, the plug shown in those applications has mounted therein a printed wiring board which is movable in longitudinal translation in a pair of guiding slots. On one surface of the wiring board, or PWB, are a plurality of spaced capacitance contact pads, the number being dependent upon the number of leads to which it is desired to add capacitance. The wire leads in the plug which, as in normal practice, wrap around the nose of the plug, have contact portions which bear against the surface of the PWB, and against the capacitance pads of the PWB in a second position thereof, or simply against the non-conducting surface of the board in a first position thereof. The plug further includes a spring member which bears against the end of the PWB remote from the plug nose, and functions to bias the PWB toward the first, non-capacitance engaging position. Actuator means, such as stand-offs from the PWB, function to engage a portion of the jack where the jack is a low performance component when the plug is inserted therein, thus moving the PWB to the capacitance engaging position to introduce capacitance into the circuit for crosstalk compensation and to alter the transmission loss characteristic in the low performance mode. Thus the high performance plug of the invention can be used with a low performance jack.

The second component of the high performance connector of these applications is a jack which has mounted therein a PWB which is movable in longitudinal translation in a pair of guiding slots. As is the case with the plug of the invention, the PWB has on one surface thereof a plurality of closely spaced capacitance contact pads, the number being dependent upon the number of leads to which it is desired to add capacitance. The wire leads in the jack have contact portions which bear against the surface of the PWB and, in a second position, against the capacitance pads thereon, or against a non-conducting portion of the PWB in a first position. The PWB, which as pointed out before, is movable relative to the jack, and more particularly, to the wire leads therein, is biased by a spring member within the jack housing to the first or non-capacitance introducing position which is the desired position for the high performance jack. The PWB has spaced actuator stand-offs mounted thereon which, as will be explained hereinafter, are pushed by the nose portion of a low performance plug to move the PWB to the second position, thereby introducing capacitance into the connector circuit. The jack is provided with first and second spaced slots which receive the stand-offs of the high performance plug of the invention, thereby preventing them from actuating the PWB in the plug. By the same token, the plug has recesses in the sides of the housing thereof which provide clearance for the stand-offs on the PWB of the jack, thereby preventing the high performance plug of the invention from actuating the PWB of the jack.

The plug and jack of the foregoing applications are characterized by each having a printed wiring board that is movable in translation, as discussed. It is also possible, if not, in the interests of cost, desirable, to have similar selectable compatibility electrical connector assemblies in which the components, i.e., the plug and jack, having stationary printed wiring boards, and it is to such arrangements that the present invention is directed.

SUMMARY OF THE INVENTION

As is the case with the copending Arnett applications, the connector assembly of a plug and a jack are designed to introduce automatically capacitance into the connection circuit when used as a low performance connector to alter the crosstalk performance and transmission characteristics thereof.

In greater detail, the plug has mounted therein a stationary printed wiring board (PWB). On one surface thereof are a plurality of spaced capacitance contact pads, the number being dependent on the number of leads to which it is desired to add capacitance. The wire leads in the plug which, as in normal practice, extend into slots in the nose of the plug, have contact portions designed to remain out of contact with the capacitance pads in the high performance configuration having a first transmission loss characteristic, and to bear against the pads in the low performance configuration and having a second different transmission loss characteristic. In a first embodiment of the plug of the invention, first and second movable non-conducting actuating members, such as buttons, bear against the leads and protrude from the surface of the plug. When the plug is inserted into a low performance jack, the jack cams the buttons down, thereby forcing the contact portion of the leads into contact with the capacitance pads. The buttons are joined together by, for example, a non-conducting rod extending therebetween and in contact with the leads so that when the buttons are depressed, all of the leads are depressed into contact with the capacitance pads. When used in a high performance connection, the jack has clearance slots that afford clearance for the buttons, which remain unactivated when the plug is inserted in the high performance jack. The resilience of the wire leads serves to maintain the buttons in the unactivated position.

In a second embodiment of the invention, the buttons are replaced by toggles of insulating material which are joined by a pivot rod and an insulating rod which perform substantially the same function. In still another embodiment of the plug of the invention, at least one or more of the wire leads has a bend therein which protrudes above the top surface of the plug so that the leads themselves are cammed downward into contact with the capacitance pads when the plug is inserted into a low performance jack.

In all of the embodiments of the plug of the invention, it may be used in a high performance connection with a corresponding high performance jack or it may be used in a low performance connection with a standard low performance jack.

The second component of the high performance connector of the invention is a jack which has mounted therein a stationary PWB having capacitance pads thereon. The wire leads within the jack are uniquely configured to remain out of contact with the capacitance pads, but to be forced into contact therewith by a moveable spacer member of insulating material having actuator stand-offs thereon which are positioned to be engaged by a low performance plug. When so engaged, the spacer member is pushed rearwardly of the jack as the plug is inserted, thereby forcing the wire leads into contact with the capacitance pads. In the high performance connector, the high performance plug has clearance slots or recesses which prevent the plug from engaging the stand-offs, and the spacer member remains in its high performance position. The natural resilience of the wire leads and their unique configuration keeps them out of contact with the PWB and its capacitance pads until engaged by the spacer member.

As a consequence of the configurations of the jack and the plug of the invention, when used together they form a high performance connection, yet each is readily adaptable for use in a low performance connection.

The numerous features and advantages of the present invention will be readily apparent from the following detailed description, read in conjunction with the drawings.

DESCRIPTION OF THE DRAWINGS

FIG. 3 is a table of industry standards for near end crosstalk (NEXT) in connecting hardware;

DETAILED DESCRIPTION

Figure 1:
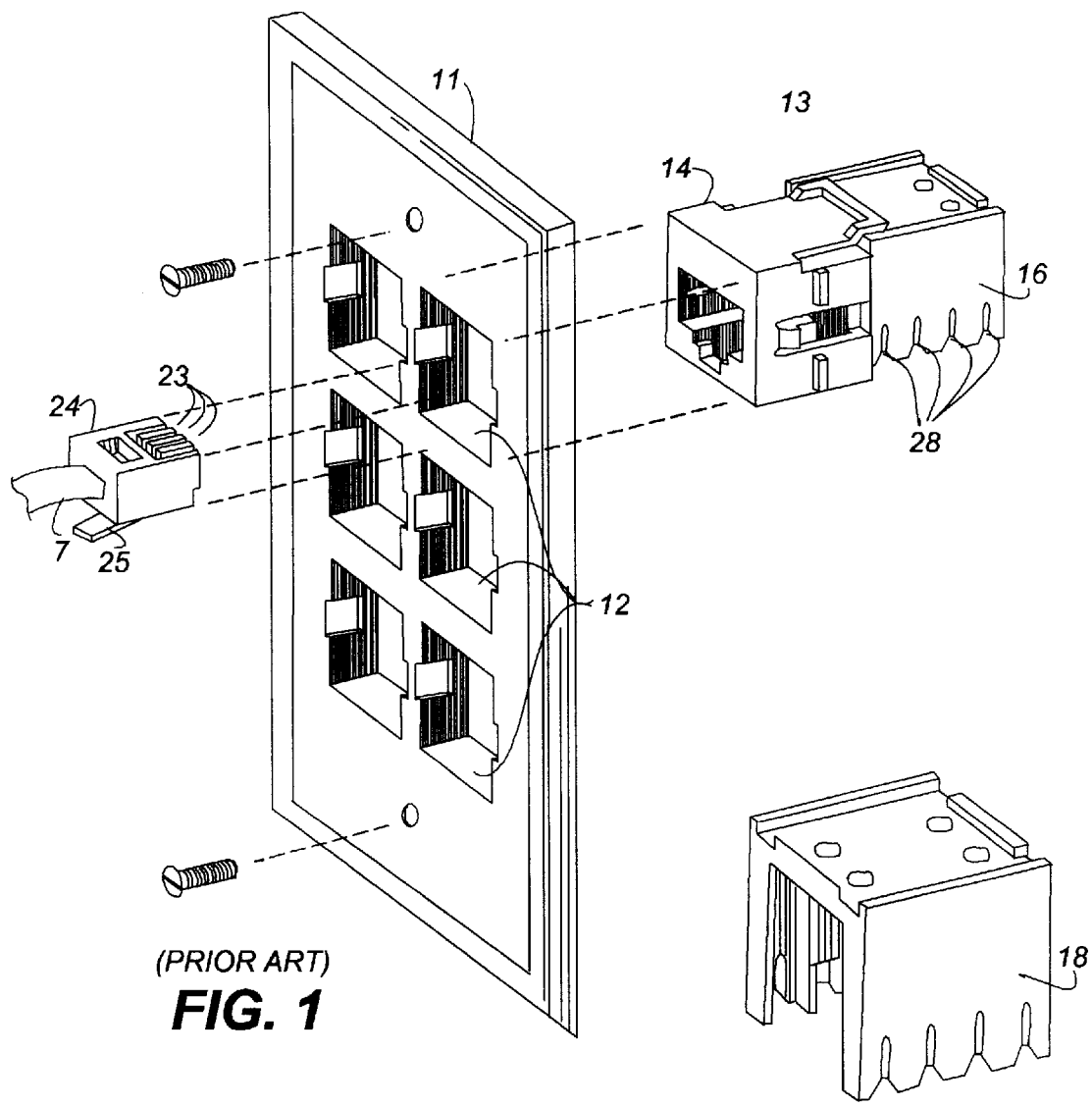
FIG. 1 is a perspective view of a prior art wall plate with a standard type connector comprising a plug and a jack.
Figure 2:
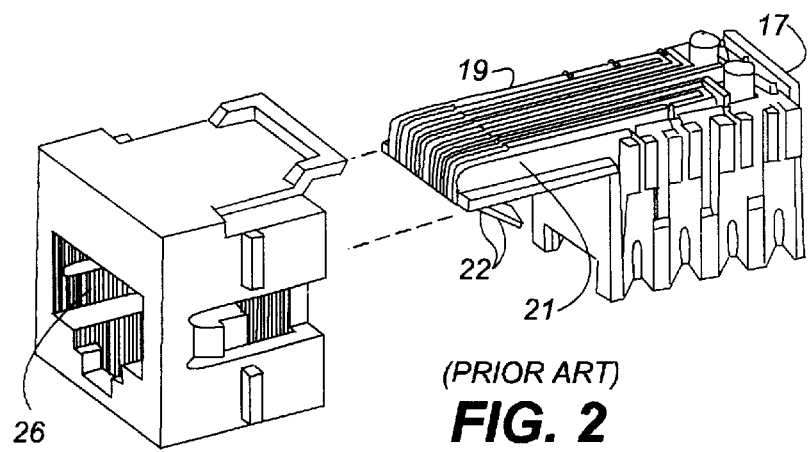
FIG. 2 is an exploded perspective view of the details of the jack of FIG. 1.

FIG. 1 depicts a prior art wall plate 11 such as is show in the aforementioned Arnett '442 patent, which has openings 12 therein for receiving up to six modular jacks 13. As shown in the Arnett patent, jack 13 comprises a jack frame 14 and a connector 16 which, together, constitute modular jack 13. As can be seen in FIG. 2, connector 16 comprises a spring block member 17 and a cover member 18. Spring block 17 has a wire frame 19 mounted thereon, the leads of which curve around the nose 21 of the spring block 17 and depend at an angle therefrom to form a plurality of spring contacts 22, which mate with contact members 23 in the plug 24 when it is inserted into the opening 26 of jack frame 14 and locked by means of trigger or latching arm 25. The contact members 23 are each connected to an individual wire in cable 27, and the spring contacts 22 are each connected to an individual wire 28 which may be part of a cable, not shown, or which may lead to individual apparatus, not shown. The plug 24 and the jack 13 may form connections for a number of wires such as, for example, four or eight, depending upon the particular application. Wire frame 19 is shown in FIG. 2 as having eight wires, and, hence, eight spring contacts 22, which plug 24 is shown as having only four contact numbers. It is to be understood that FIG. 2 does not depict a specific connector hook-up, but is intended to illustrate the relationship of the various parts or components of the connector module. The arrangement of FIGS. 1 and 2 has heretofore been modified in numerous ways, as pointed out hereinbefore, in efforts to improve the near end crosstalk (NEXT) performance, achieve greater compactness, or to facilitate the operation of connection/disconnection in usage. In all such cases, the actual connect/disconnect operation of the apparatus is basically the same, even where the plugs or jacks have been modified extensively for whatever reason. In other words, the industry standards have to be met.

The present invention is a connector system which is intended to extend the performance range of operation but which complies with industry standards to the extent that the plug and jack of the invention are compatible with existing plugs and jacks, and which, automatically introduce capacitance into the circuitry upon sensing that either the plug or the jack is being used with a pre-existing prior art jack or plug. Thus, the plug and jack of the present invention exhibit "backward compatibility." In FIG. 3, there is shown a table depicting the industry standard allowable NEXT loss requirements at different frequencies and for different performance standard connectors, ANSI/TIA/EIA 568-A as promulgated by the Telecommunications Industry Association. In the table, the dB values given are, in all cases, negative values, and represent the worst-pair NEXT loss. It can be seen that the allowable loss, at 16 MHz, for a low performance connector (Category 3) is –34 dB, whereas, for a higher performance connector (Category 5) it is –56 dB, a much better performance figure. At the present time, new standards are in the process of being established for even higher categories of connectors, hence the term "high performance" and it is to these connectors that the present invention is primarily directed.

"Backward compatibility" is, at present, being explored in the prior art, and proposals exist for achieving it. In a monograph entitled "Connectors With Accessed Quality For Use In D.C., Low Frequency Analogue, And In Digital High Speed Data Applications, IEC 61076-X-Y, issued by the International Electrotechnical Commission, there are shown several suggested arrangements for achieving compatibility among plugs and jacks. Most of the jacks and plugs therein disclosed rely upon switching, either manually or automatically, between two different wiring schemes, whereas the present invention, as will be apparent hereinafter, relies upon the introduction or removal of capacitance or other current elements from the components or components of the connector system.

Compatible Connector Assembly

Figure 4:
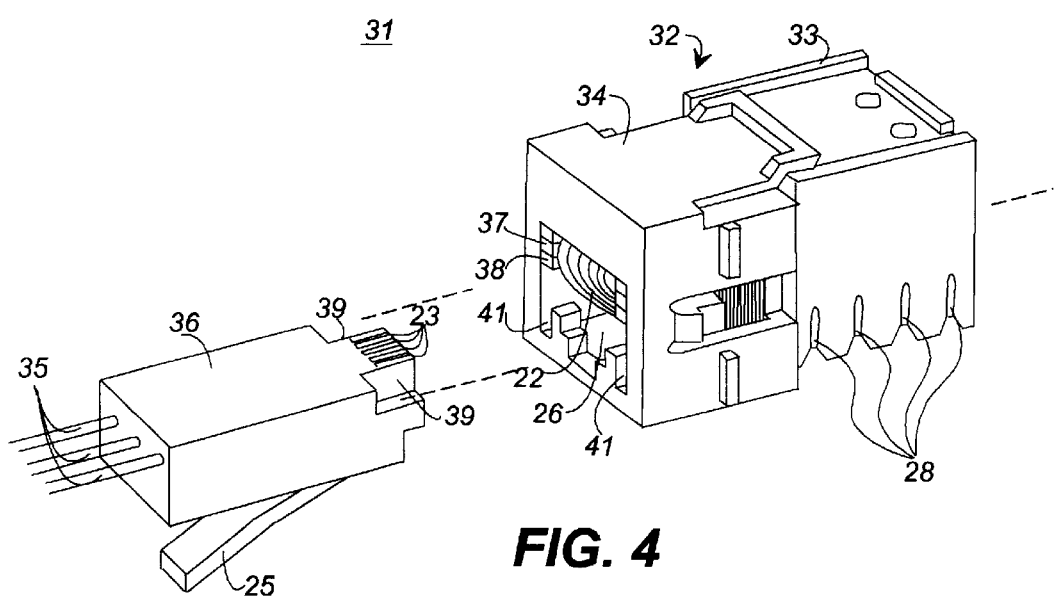
FIG. 4 is a perspective view of a connector assembly which embodies the unique plug and the unique jack of the present invention.

In FIG. 4 there is shown the connector assembly 31 of the present invention which comprises a jack 32 having a spring block assembly 33 and a jack frame 34, and a plug 36, connected to leads 35 of a cable or the like for use in high performance e.g. high speed data operation, but automatically adaptable for use in low performance, e.g., low frequency analog operation. Both jack 32 and plug 36 are configured and wired for high performance operation in anticipation of the new parametric standardized requirements, and, as such, exhibit low crosstalk operation. As will be seen more clearly hereinafter, plug 36 has mounted therein a stationary printed wiring board having a plurality of capacitance contact pads, and actuator means (not shown in FIG. 4) which function to engage a portion of a low performance jack to move the conductors into contact with the capacitance pads to introduce them into the wiring circuit. Jack 32 also has a stationary printed wiring board 37 therein, having an actuator 38, which functions to engage a portion of a low performance plug when inserted into jack opening 26 to move the conductors into contact with the printed wiring board to introduce capacitance into wiring circuit. The PWBs may have more than one surface with capacitance sources thereon, or may have a layered configuration with circuit components on at least one surface thereof. Plug 36 has first and second recessed portions or notches 39 which are dimensioned to allow plug 36 to be inserted into opening 26 without contacting actuator 38 and jack 32 has clearance notches 41 which are dimensioned to allow the actuators for the PWB of plug 36 to pass into jack 32 without contacting the front face thereof. Thus, when jack 32 and plug 36 form a high performance (proposed category 6 and above) connection, neither PWB is caused to be introduced into the circuit, hence, no additional capacitance is introduced. On the other hand, if jack 32 receives a low performance plug, actuators 38 will be forced toward the rear and, as will be seen hereinafter, capacitance will be introduced. Also, if plug 36 is inserted into a low performance jack, its actuators will move the conductors therein to the capacitance introducing position.

In both the plug 36 and the jack 32, the actuators which cause the conductors therein to contact the capacitance pads or other possible circuit elements of the stationary printed wiring boards are responsive only to the presence of a low performance jack or plug with which the plug or jack of the present invention is mated. When both the plug and the jack are configured in accordance with the present invention, i.e., both high performance, mating then does not activate the actuators, each having clearances for the actuators, hence, the conductors within the plug and the jack are not moved or depressed into contact with the PWB. On the other hand, when either the plug or the jack of the invention is mated with a low performance jack or plug, neither of which has clearance for the actuators of the other components, then the low performance component activates the actuator or actuators which, in turn, depress the conductors into contact with the printed wiring board. In this manner, either the high performance plug or jack of the invention becomes a low performance component to match its mated component.

Plug

Figure 5:
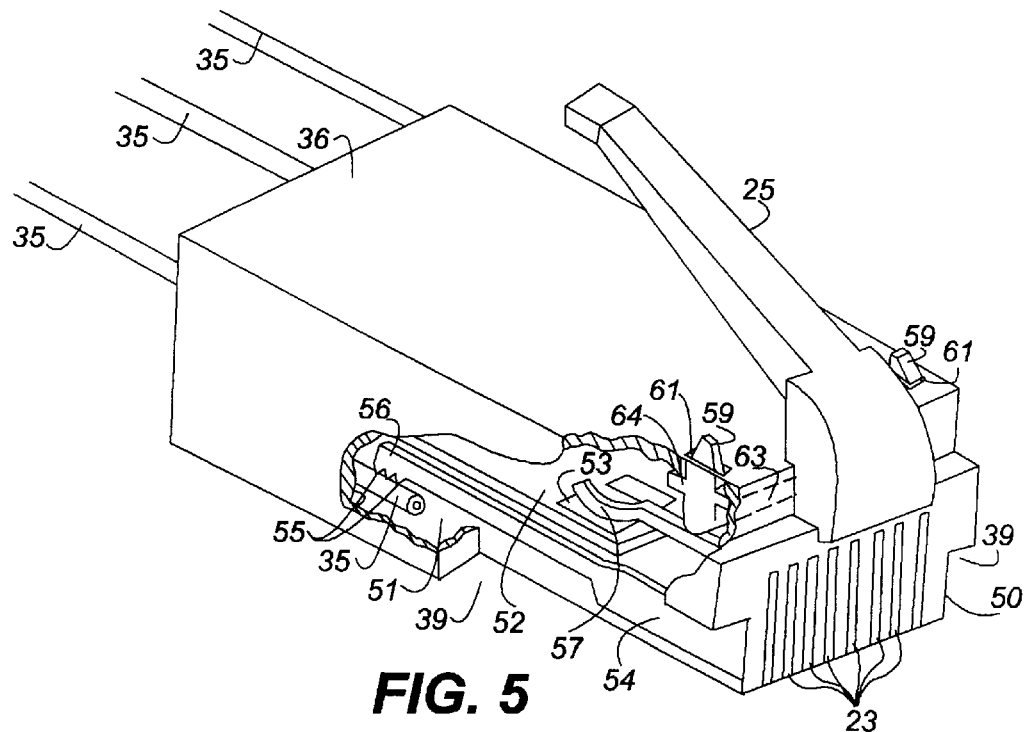
FIG. 5 is a perspective, partially cutaway, view of a plug embodying principles of the invention.

In FIG. 5 there is shown a preferred embodiment of the plug 36 of the invention.

Figure 6A:
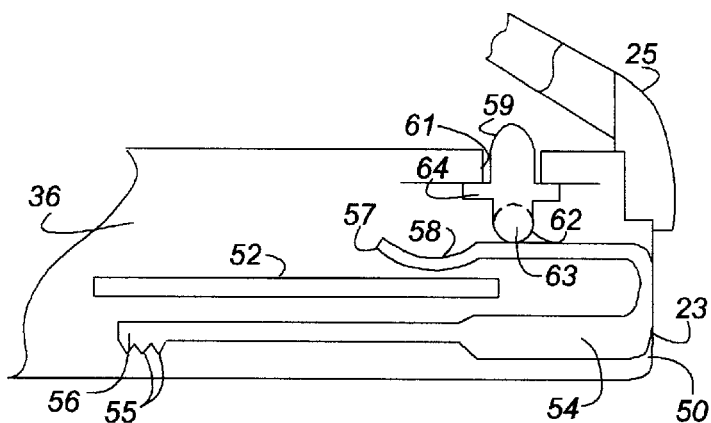
FIG. 6A is a partial sectional elevation view of the plug of FIG. 5 in its high performance configuration.
Figure 6B:
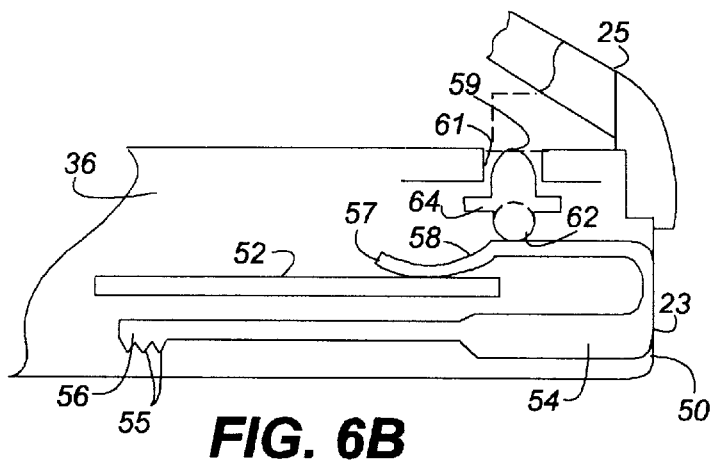
FIG. 6B is a partial sectional elevation view of the plug of FIG. 5 in its low performance configuration.

Plug 36 comprises a substantially hollow body portion 51 having a nose or connector end 50 having a plurality of contact members 23 and a cable connection end 53 shown, for illustrative purposes only connected to three input wires 35. It is to be understood that wires 35 are representative of a cable, or whatever number, 4, 6, 8, 12, or more of wires to be connected. As previously pointed out, the nose end 50 has first and second recessed portions 39 to allow clearance for actuators 38 of the jack 32, even when the plug 36 is fully inserted into the jack 32. Mounted within plug body 51 is a printed wiring board 52, i.e., PWB, which is fixed within body 51 by suitable means, not shown. For example, board 52 might be cemented in place, or fitted into channels (not shown) within body 51 and cemented. PWB 52 is shown as having a plurality of capacitance pads 53 arrayed as shown beneath the conductive member 23. It is to be understood that, while capacitance pads 53 (preferably gold plated) are shown, the principles of the invention are extendable to more sophisticated circuitry on PWB 52 for accomplishing other types of crosstalk reductions, for example. As best seen in FIGS. 6A and 6B, contact members are preferably in the form of blades 54, each having a distal end 56 on which are located insulation piercing teeth 55 for making electrical contact with each of the insulated wires 35. At the connector end 50, the blades 54 have a U-shaped configuration, as shown, to form the contacts 23, and each has an end 57 having a contact bow or bend 58. First and second non-conducting actuating members, each as buttons 59, are disposed in slots 61 in the top of plug body 51 and project upwardly therefrom, as seen in FIG. 5. The bottoms 62 of buttons 59 are rounded and bear against the tops of blades 54, and are preferably joined by a non-conducting actuating bar 63, shown in dashed lines, which bears against the tops of blades 54. Each button 59 has a flange 64 thereon to prevent it from extending too far out of the plug body 51. As best seen in FIGS. 6A and 6B, which depicts the high performance and low performance configurations respectively, the resilience of blades 54 causes them to act as springs and hold the buttons in the position shown in FIG. 6A. However, when the plug 36 is inserted into a low performance jack, shown in dashed lines in FIG. 6B, the buttons 59 are cammed down by the jack, and the blades 54 are depressed so that their contact bends 58 make contact with the circuitry on PWB 52, e.g., capacitance pads 53, as best seen in FIG. 6B, thereby converting the plug 36 to a low performance plug. When the plug 36 is removed from the jack, the blades 54 spring back, producing the configuration of FIG. 6A.

The plug 36 shown in FIGS. 5, 6A, and 6B represents a preferred embodiment of the principles of the invention. It is to be understood, however, that various other configurations or structures which embody the principals of the invention might be used.

Figure 7A:
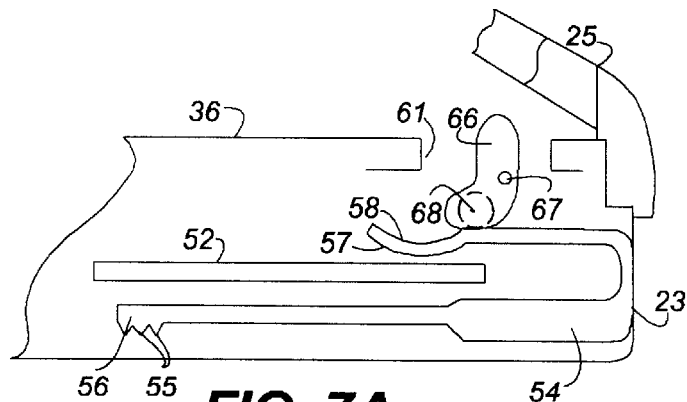
FIG. 7A is a partial sectional elevation view of an alternative actuating arrangement for the plug of FIG. 5, in the high performance configuration.
Figure 7B:
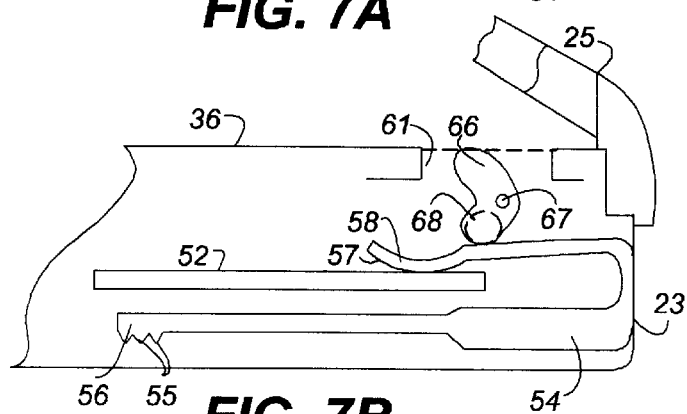
FIG. 7B is a partial sectional elevation view of the plug of FIG. 7A in its low performance configuration.

For example, there is shown in FIGS. 7A and 7B a variation of the arrangement of FIGS. 5, 6A, and 6B, which accomplishes the same ends. For simplicity, like parts bear the same reference numerals. As can be seen in FIGS. 7A and 7B, the buttons 59 of FIG. 5 have been replaced by substantially L-shaped toggles 66 which pivot with a bar or rod 67 which is pivotally mounted in the plug body 51. The lower limbs of the toggles 66 are joined together by an actuating bar 68 shown in dashed lines in a manner similar to that of bar 63 in FIG. 5. In the high performance configuration, shown in FIG. 7A, the spring pressure of the blades form the toggles to pivot so that contact bend 58 is out of contact with PWB 52. When plug 36 is inserted into a low performance jack, shown in dashed lines in FIG. 7B, the jack causes the toggles 66 to pivot so that the blades 54 are forced down so that contact bend 58 of each blade is forced into contact with the circuitry on the PWB, thus converting the plug 36 to a low performance plug.

Figure 8A:
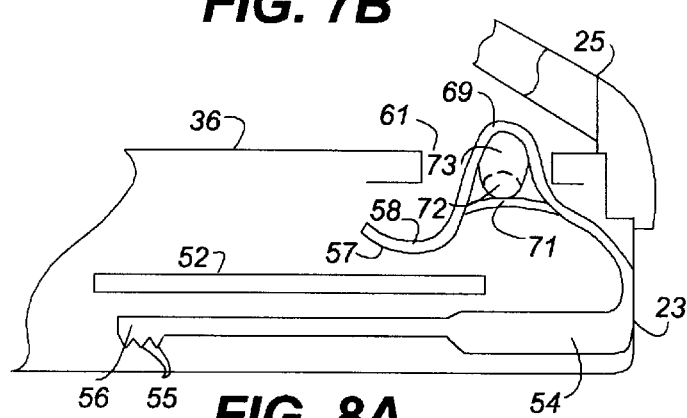
FIG. 8A is a partial sectional elevation view of another alternative actuating arrangement for the plug of FIG. 5, in the high performance configuration.
Figure 8B:
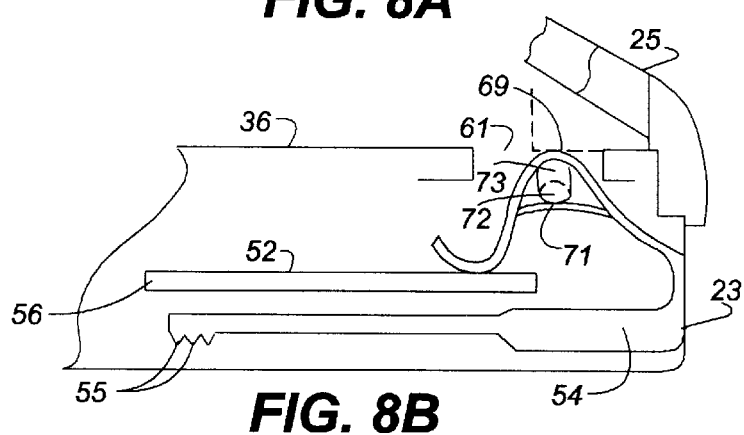
FIG. 8B is a partial sectional elevation view of the arrangement of FIG. 8A in the low performance configuration.

In FIGS. 8A and 8B there is shown still another embodiment of the present invention, in which the toggles 66 and/or the buttons 59 are not necessary for operation, being replaced by an additional bend 69 in blades 54 which causes at least the blades 54 on each end of the array to extend above the top surface of plug 36, as shown in FIG. 8A. When the plug 36 of FIGS. 8A is inserted into a low performance jack, shown in dashed lines, the two end blades are forced down as shown in FIG. 8B to bring contact bends 58 into contact with PWB 52. The remaining blades, (designated 71 in FIGS. 8A and 8B, are forced down by a non-conducting actuating bar 72 having lobes 73 at each end which are connected to the two end blades. The slot 61 can be made to extend across the top wall of body 51 to insure sufficient clearance, if necessary. The bent portions 69 of the blades 54 are subject to exposing users to electrical voltage, as can be seen in FIG. 8B, hence an insulative coating thereon such as Mylar tape, is to be preferred.

From the foregoing, it can be seen that the selectable compatibility plug 36, primarily shown in FIG. 5, automatically adjusts the kind of jack (low or high performance) with which it is used. Thus, with the advent of higher performance jacks, only one plug design, as shown, for example, in FIG. 5, is necessary inasmuch as plug 36 of the invention operates satisfactorily with low or high performance jacks, with a material cost savings and with no necessity for the installer, for example, to carry a member of different types of plugs.

The plug as disclosed and described herein is the subject of U.S. patent application Ser. No. 09/292,141, of Jaime R. Arnett.

Jack

Figure 9:
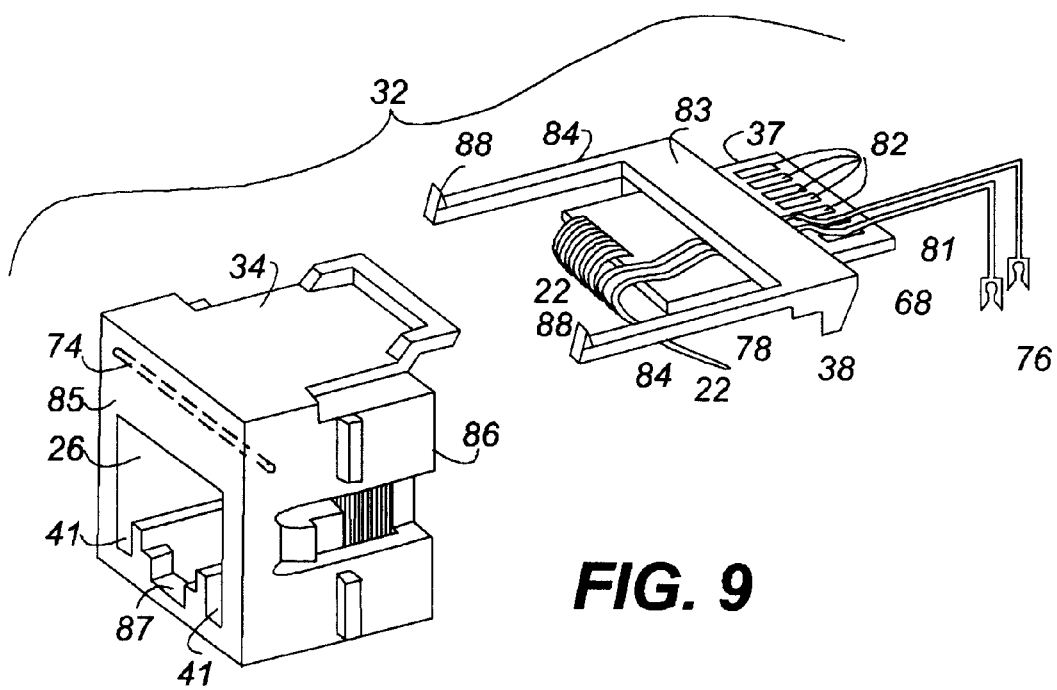
FIG. 9 is an exploded perspective view of the jack of the present invention.

In FIG. 9 there is shown, in an exploded perspective view, a preferred embodiment of the jack 32 of the invention, with only those components which are involved in the structure of the invention being shown, for simplicity. Thus, only jack frame 34, but it is to be understood that other elements of the jack, which depend, at least in part, on the particular use to which it is to be put, are also to be included. Thus, the disclosure of U.S. Pat. No. 5,096,442 of Arnett et al. is incorporated herein by reference, especially for its showing of the basic components of a jack.

Figure 10:
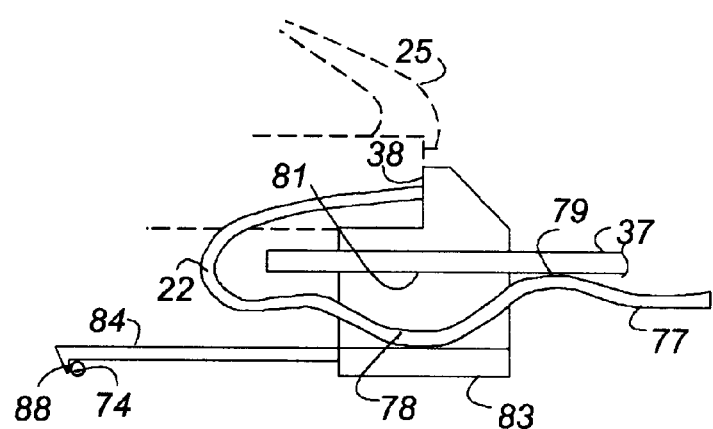
FIG. 10 is a detail of the jack of FIG. 9.

As shown in FIG. 9, jack frame 34 is substantially the same as jack frame 34 in FIG. 4 and has a front face 85 at the connector end having an opening 26 therein, configured to receive a plug. Opening 26 has a pair of clearance notches 41 which provide clearance for the actuators 59, 66, or 69 of the plug 36. Jack frame 34 is at least partially hollow, as shown, and has a rear face or portion 86. Opening 26 also has a notch 87 therein for receiving the latching member 25. In the interior of jack frame 34, at the front thereof, is a bar spring member 74 shown in dashed lines which extends transversely of the jack frame 34 and is affixed thereto at its ends, as shown. Spring contact members 22, which are mounted within the jack frame 34 by any of a number of arrangements known in the art, are the contact ends of lead frames, the other ends of which terminate in, for example, insulation displacement connector 76. It is to be understood that other types of connections than insulation displacement types, the IDCs shown in FIG. 9 being by way of example only. Elongated leads 77 connect the spring contact members with the IDCs 76. Each lead 77 has an S-shaped bend therein which comprises a first bend portion 78 and a second reverse bend portion 79, as best seen in FIG. 10, which is an inverted detail view of a portion of the apparatus of FIG. 9. In the high performance configuration of jack frame 34, the second bend 79 does not contact the printed wiring board 37 and the circuitry on surface 81 thereof. Board 37 is mounted within jack frame 34 in any suitable manner to affix it in a stationary position, oriented and located as shown in FIGS. 9 and 10 so that the capacitance pads 82 (or other circuitry) directly underly bends 79 as shown in FIG. 9, or overly them, as shown in FIG. 10. A spacer member 83 of suitable insulating or non-conducting material is movably mounted in jack frame 34 and has, on either side thereof, spring engaging arms 84 having spring engaging hooks 88 on their distal ends. Actuator members 38 extend from spacer member 83 and are positioned to be engaged by a low performance plug, shown in dashed lines in FIG. 10. The high performance plug 36 of the invention, on the other hand, because of the recessed portions 39 on either side thereof does not engage the actuator members 38, and actuator 83 remains stationary, held in non-PWB engaging position by bar spring member 74 which is engaged by hooks 88. When a low performance plug is inserted into jack frame 34, as shown in FIG. 10, it engages actuator members 38 and forces spacer member 83 toward the rear, causing it to press against first bend portion 78 which, in turn, causes second bend portion 79 to engage the circuitry on PWB 37, as best seen in FIG. 10.

Spacer member 83 moves rearwardly against the force of spring member 74, and when the latching arm on the plug, designated 25 in FIG. 10, locks in place, the spring 74 is prevented from pulling spacer 83 forward into its non-engaging position. On the other hand, when the low performance plug is removed, spring 74 restores spacer 83 to its non-engaging, or high performance, position.

It is to be understood that, in some circuit configurations, it will be desired for the capacitance pads, or other circuitry, to be in contact with the leads 77 in the un-actuated position, to be moved out of such contact when a plug is inserted into the jack. From the foregoing it can be seen that the principles of the invention are equally applicable to such an arrangement. In any case, the plug and jack of the invention automatically adapt for use, individually, with low performance jacks or plugs yet, when used together, constitute a jack performance connection. The jack depicted and described herein is the subject of U.S. patent application Ser. No. 09/292,526, of Jaime R. Arnett.

In conclusion, it should be noted from the detailed description that it will be obvious to those skilled in the art that many variations and modifications may be made to the preferred embodiment without substantial departure from the principles of the present invention. All such variations and modifications are intended to be included herein as being within the scope of the present invention as set forth in the claims. Further, in the claims hereafter, the corresponding structures, materials, acts, and equivalents of all means or step plus function elements are intended to include any structure, material, or acts for performing the functions with other claimed elements as specifically set forth.

I claim:

1. A high performance connector assembly comprising:
    a first member comprising a jack and a second member comprising a plug, each of said members having the high performance mode, and being adapted to mate with each other to form the high performance connector;
    each of said first and second members having a circuit member mounted thereto in fixed position;
    each of said first and second members having at least one conductive lead therein for electrically contacting at least one lead in the other one of said members, each of said leads being movable into contact with one of said circuit members for altering the performance mode of said first and second members and actuator members for moving said leads into electrical contact with each circuit members; and
    each one of said first and second member for preventing said actuator members from moving said conductive lead in said first and second members into electrical contact with said circuit member in each of said members for maintaining each of said first and second members in the high performance mode when said members are mated.

2. A high performance electrical connector assembly comprising:
    a first member comprising a jack and a second member comprising a plug, each of said members having the high performance mode and being adapted to mate with the other members;
    said first member having a first fixed circuit member therein and having a plurality of conductive leads overlying said circuit member and spaced therefrom;
    at least one actuator member for moving said leads into conductive contact with said first circuit member for altering the performance mode of said first member to produce a change in said performance mode; and
    said second member having a clearance portion for preventing said actuator member from moving said leads into contact with said first circuit member when said first and second members are mated.

3. A connector assembly as claimed in claim 2 wherein said second member has a second fixed circuit member therein and a second plurality of conductive leads overlying said circuit member and spaced therefrom;
    a second actuator member for moving said leads into conductive contact with said second circuit member for altering the transmission loss characteristic of said second member to produce a second loss characteristic; and said first member having a clearance portion for preventing said second actuator from moving said leads into contact with said second circuit member.

4. A connector assembly as claimed in claim 2 wherein said first member is a high performance jack and said second member is a high performance plug.

5. A connector assembly as claimed in claim 2 wherein said first fixed circuit member is a printed wiring board having circuit elements on at least one surface thereof positioned to be contacted by at least some of said first plurality of leads.

6. A connector assembly as claimed in claim 3 wherein said second fixed circuit member is a printed wiring board having circuit elements on at least one surface thereof positioned to be contacted by at least some of said second plurality of leads.

* * * * *